(12) United States Patent
Daniel et al.

(10) Patent No.: US 9,891,788 B2
(45) Date of Patent: Feb. 13, 2018

(54) METHODS OF OPERATION AND COMPUTER PROGRAM PRODUCTS FOR TOUCH SENSITIVE MOBILE DEVICES

(71) Applicant: Celltick Technologies Ltd., Herzliya (IL)

(72) Inventors: Ronen Daniel, Hod Hasharon (IL); Amit Gil, Yehud (IL)

(73) Assignee: CELLTICK TECHNOLOGIES LTD., Herzliya (IL)

( * ) Notice: Subject to any disclaimer, the term of this patent is extended or adjusted under 35 U.S.C. 154(b) by 322 days.

(21) Appl. No.: 14/422,605

(22) PCT Filed: Jul. 30, 2013

(86) PCT No.: PCT/IL2013/050646
§ 371 (c)(1),
(2) Date: Feb. 19, 2015

(87) PCT Pub. No.: WO2014/030152
PCT Pub. Date: Feb. 27, 2014

(65) Prior Publication Data
US 2015/0212666 A1 Jul. 30, 2015

(30) Foreign Application Priority Data
Aug. 19, 2012 (IL) .......................................... 221529

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/0488* (2013.01);
(Continued)

(58) Field of Classification Search
CPC ... G06F 3/04842; G06F 3/0485; G06F 3/0482
See application file for complete search history.

(56) References Cited

U.S. PATENT DOCUMENTS

2007/0152981 A1 7/2007 Im et al.
2007/0277125 A1* 11/2007 Shin .................... G06F 3/04883
715/863
(Continued)

FOREIGN PATENT DOCUMENTS

CA 2 638 620 2/2009

OTHER PUBLICATIONS

International Search Report for International Application No. PCT/IL2013/050646 dated Nov. 11, 2013.

*Primary Examiner* — Dino Kujundzic
(74) *Attorney, Agent, or Firm* — Pearl Cohen Zedek Latzer Baratz LLP

(57) ABSTRACT

Methods of operation and computer program products for enabling a user to employ a single discrete navigation gesture to select and launch a mobile device destination. The mobile device destination can be a child mobile device destination pointed to by a parent mobile device destination. The mobile device destination can be a user selected mobile device destination from a library of mobile device destinations too long to be depicted simultaneously on a display screen. One embodiment requires a user to draw an additional segment of a single discrete navigation gesture to change one or more instantaneously depicted mobile device destination icons. Another embodiment requires a user to maintain user contact on a navigation item to change one or more instantaneously depicted mobile device destination icons.

15 Claims, 21 Drawing Sheets

(51) Int. Cl.
*G06F 3/0488* (2013.01)
*G06F 3/0486* (2013.01)
*H04M 1/725* (2006.01)
*G06F 3/0481* (2013.01)
*G06F 3/0484* (2013.01)

(52) U.S. Cl.
CPC ...... *G06F 3/04817* (2013.01); *G06F 3/04842* (2013.01); *G06F 3/04847* (2013.01); *H04M 1/72522* (2013.01); *H04M 1/72583* (2013.01)

(56) References Cited

U.S. PATENT DOCUMENTS

| | | |
|---|---|---|
| 2008/0055264 A1 | 3/2008 | Anzures et al. |
| 2008/0313538 A1 | 12/2008 | Hudson |
| 2010/0185989 A1* | 7/2010 | Shiplacoff ............. G06F 3/0416 715/856 |
| 2010/0269040 A1* | 10/2010 | Lee .................... G06F 3/04817 715/702 |
| 2011/0096087 A1* | 4/2011 | Chun ................. G06F 3/04886 345/592 |
| 2011/0316797 A1* | 12/2011 | Johansson ........... G06F 3/04847 345/173 |
| 2013/0162571 A1* | 6/2013 | Tamegai ............... G06F 3/0412 345/173 |
| 2014/0109024 A1* | 4/2014 | Miyazaki ........... G06F 3/04883 715/863 |

\* cited by examiner

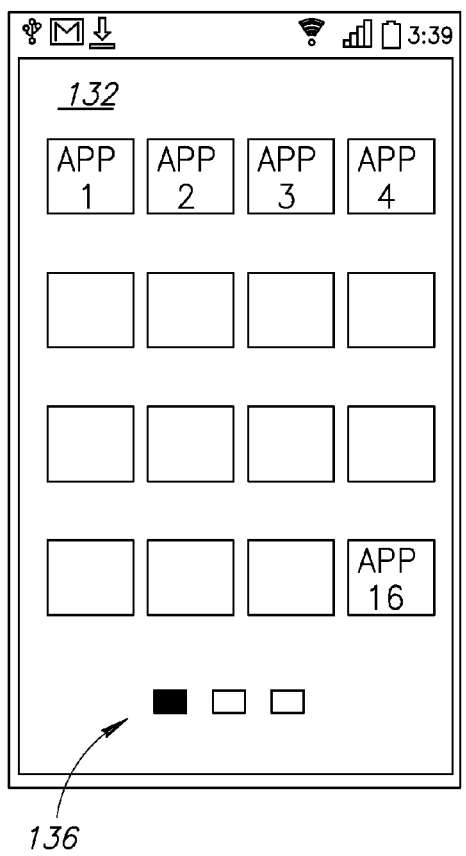
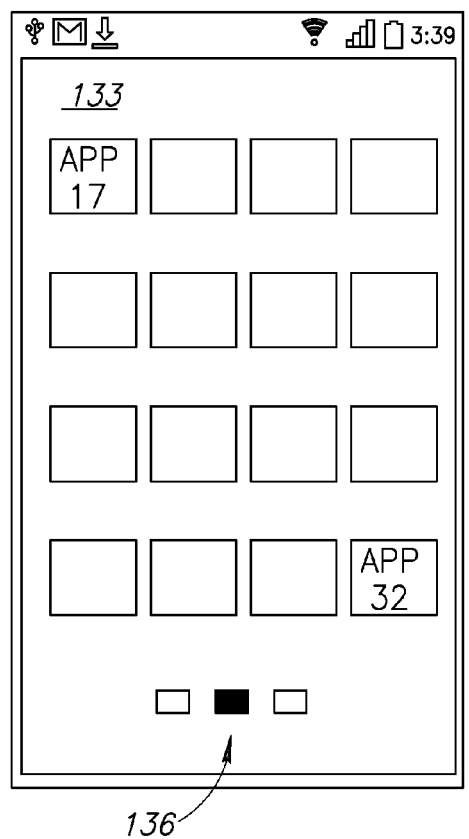
FIG.5
(PRIOR ART)
FIG.6
(PRIOR ART)

METHODS OF OPERATION AND COMPUTER PROGRAM PRODUCTS FOR TOUCH SENSITIVE MOBILE DEVICES

CROSS-REFERENCE TO RELATED APPLICATIONS

This application is a National Phase Application of PCT International Application No. PCT/IL2013/050646, entitled "METHODS OF OPERATION AND COMPUTER PROGRAM PRODUCTS FOR TOUCH SENSITIVE MOBILE DEVICES", International Filing Date Jul. 30, 2013, published on Feb. 27, 2014 as International Publication No. WO 2014/030152, which in turn claims priority from Israel Patent Application No. 221529, filed Aug. 19, 2012,all of which are incorporated herein by reference in their entirety.

FIELD OF THE INVENTION

This invention relates to methods of operation and computer program products for touch sensitive mobile devices.

BACKGROUND OF THE INVENTION

Touch sensitive mobile devices employ a touch sensitive screen for simultaneously depicting content and enabling a user to draw discrete navigation gestures. Mobile device operating systems typically display a lock screen requiring a user to draw a discrete unlock gesture to confirm that he has deliberately activated his mobile device. Mobile device operating systems also typically display a home screen for depicting parent mobile device destination icons for enabling a user to launch different mobile device applications including inter alia a phone application for placing a call, one or more messaging applications for sending a message, one or more browsing applications for browsing the internet, and the like. More recent mobile device operating systems combine the functionalities of a lock screen and a home screen into a single combined lock/home screen such that a single navigation gesture activates a mobile device and launches a mobile device application.

Many users have many tens of pre-installed or self-installed mobile device applications and a hundred or more contacts. The present invention affords a more convenient user experience to select and launch a mobile device destination.

Terminology

The following terms are employed in the description and the claims:

Mobile device: Mobile devices in the context of the present invention include inter alia smart phones, tablets, and the like.

User contact: User contact on a touch sensitive screen of a touch sensitive mobile device in the context of the present invention includes inter alia a user placing his finger to physically contact a touch sensitive screen to draw a discrete navigation gesture, using a stylus or similar pointed instrument to draw a discrete navigation gesture, and the like.

Discrete navigation gesture: Single continuous user contact with a touch sensitive screen from an initial user contact thereon to a final user release therefrom. User release from a touch sensitive screen can be intentional to indicate termination of a single discrete navigation gesture or inadvertent, for example, because a user was distracted by someone calling his name, and the like. Discrete navigation gestures include so-called single finger movement actions such as taps, swipes, pinching, complete circles, and the like. Swipes can be straight or curved. Discrete navigation gestures also include so-called multiple finger movement actions consisting of two or more continuous finger movements. The continuous finger movements can include straight finger movements angled to each other, curved finger movements, and a combination of straight and curved finger movements. Adjacent straight finger movements can subtend an acute angle, a right angle to form a draw a letter L or an obtuse angle. A user may pause a single discrete navigation gesture at a particular screen location and continue with the same single discrete navigation gesture.

Types of Mobile Device Destinations

The following types of mobile device destinations are described in the description and the claims:

Mobile device destination: A mobile device destination can include inter alia a mobile device application, a website/URL, a contact person details, a log entry, for example, a missed call, a multimedia item, and the like.

Parent mobile device destination: A mobile device destination which can be selected by a unique mobile device destination icon depicted on a home screen and/or a lock screen. Parent mobile device destinations can have one of three destination functionalities described hereinbelow including optionally pointing to one or more child mobile device destinations. Parent mobile device destinations include inter alia messaging options, a library of applications, favorite websites, favorite contacts, and the like.

Child mobile device destination: A mobile device destination which can be selected and launched from a unique child mobile device destination icon. A child mobile device destination can be typically arrived at from one or more parent mobile device destinations. A child mobile device destination can optionally point to its own one or more child mobile device destinations. Child mobile device destinations can typically number from a few child mobile device destinations to hundreds of child mobile device destinations. The lists of child mobile device destinations can be sorted by different parameters depending on their nature. Typical parameters include inter alia date and time, alphabetical, frequency, and the like.

Library of mobile device destinations: A multitude of similar mobile device destinations of the same type, for example, applications, websites, contact persons, and the like. Libraries of mobile device destinations are typically too long to be depicted on a single display screen.

Mobile device destination set: A multitude of mobile device destinations including at least one parent mobile device destination and at least one child mobile device destination.

Types of Display Screens

The following types of display screens are described in the description and the claims:

Default display screen: A display screen displayed on a touch sensitive screen on detection of user release from the touch sensitive screen not at a display screen icon. The display screen icon can be a parent mobile device destination icon, a child mobile device destination icon, and the like. The default display screen can be defined to be a mobile device's lock screen, its home screen, its combined lock/home screen, and the like. A mobile device can be programmed to have repeatedly display the same default display screen. Alternatively, a mobile device can be programmed to display different default display screens under different circumstances.

Destination display screen: A display screen pursuant to the selection and launching of a mobile device destination.

Home screen: A display screen displaying at least one parent or child mobile device destination icon.

Intermediate navigation display screen: A display screen displayed during the course of a single discrete navigation gesture. During the course of a single discrete navigation gesture, a mobile device can display one or more intermediate navigation display screens.

Lock screen: Lock screens in the context of the present invention are display screens displayed on a touch sensitive screen when a mobile device is in a so-called lock state and the mobile device is operative in a limited way without a user executing a discrete unlock gesture to unlock the mobile device. Lock screens may include, for example, a 3 by 3 grid of points requiring a user to draw a security pattern connecting two or more points.

SUMMARY OF THE INVENTION

Generally speaking, the present invention is directed towards methods and computer program products for touch sensitive mobile devices including a mobile device operating system operative with a touch sensitive screen for displaying display screens, and detecting user contact thereon and user release therefrom. In greater particularity, the present invention is directed towards methods of operation of touch sensitive mobile devices for enabling a user to employ a single discrete navigation gesture to select and launch a mobile device destination. The single discrete navigation gestures of the present invention can start with an unlock gesture before proceeding to select and launch a mobile device destination.

In accordance with a first aspect of the present invention, there is provided a method of operation for enabling a user to employ a single discrete navigation gesture to select and launch a child mobile device destination. In greater particularity, the method of operation includes the following steps:

(a) on detecting user contact on the touch sensitive screen, displaying an intermediate navigation display screen depicting at least one parent mobile device destination icon;

(b) on detecting continuous user contact on the touch sensitive screen displaying the step (a)'s intermediate navigation display screen at a parent mobile device destination icon of a user selected parent mobile device destination, displaying another intermediate navigation display screen depicting at least one child mobile device destination icon associated with the user selected parent mobile device destination;

(c) on detecting user release from the touch sensitive screen displaying step (b)'s intermediate navigation display screen, thereby terminating a user's single discrete navigation gesture, (c1) at a child mobile device destination icon of a user selected child mobile device destination, launching the child mobile device destination, and (c2) neither at a parent mobile device destination icon nor at a child mobile device destination icon, not launching a child mobile device destination.

In accordance with a second aspect of the present invention, there is provided a method of operation for enabling a user to employ a single discrete navigation gesture to select and launch a user selected mobile device destination from a library of mobile device destinations. This second aspect of the present invention is particularly suitable for gesture navigation through long lists of similar mobile device destination icons which are too long to be depicted simultaneously on a display screen.

This second aspect of the present invention can be implemented by two alternative embodiments as follows: In one embodiment, a group of at least one mobile device destination icon is depicted on a display screen and a user is required to draw an additional segment of his single discrete navigation gesture to change one or more mobile device destination icons of the group of at least one mobile device destination icon. Additional consecutive segments can trace the same forward and backward path on a touch sensitive screen, a closed path, for example, a square, or an open path.

In the alternative embodiment, a group of at least one mobile device destination icon is depicted on a display screen, and a user maintains his finger position at a predetermined screen location for automatically changing one or more mobile device destination icons of the group of at least one mobile device destination. The alternative embodiment can be programmed with two alternative mobile device destination selection schemes as follows:

First, a user is required to navigate his finger to a mobile device destination icon of a user selected mobile device destination for launching the mobile device destination on user release from the touch sensitive screen thereat. User release not at a mobile device destination icon, does not launch a mobile device destination.

And second, a display screen depicts a destination zone for indicating a mobile device destination icon of an instantaneously displayed group of at least one mobile device destination icon and a cancel navigation icon for not launching a mobile device destination on detection of user release from the touch sensitive screen thereat. The destination zone is necessarily readily visually distinguishable from the remaining display screen so that a user can clearly recognize which mobile device destination icon is presently being indicated. Such visual distinction can be achieved by a background color, a flashing display screen zone, and the like. Accordingly, detection of user release from the touch sensitive screen at any screen location except at the cancel navigation icon, launches the mobile device destination indicated by the destination zone.

In greater particularity, the former embodiment of the method of operation includes the following steps:

(a) displaying a display screen depicting a group of at least one mobile device destination icon of the library of mobile device destination icons, and a forward navigation icon for navigating forward through the library of mobile device destination icons;

(b) on detecting continuous user contact on the touch sensitive screen at the forward navigation icon, refreshing the display screen to depict the group of at least one mobile device destination icon with at least one new mobile device destination icon and another forward navigation icon offset from the previously depicted forward navigation icon;

(c) on detecting continuous user contact at the touch sensitive screen at step (b)'s another forward navigation icon, repeating step (b); and (d) on detecting user release from the touch sensitive screen, thereby terminating a user's single discrete navigation gesture, (d1) at a mobile device destination icon of a user selected mobile device destination, launching the user selected mobile device destination, and (d2) not at a mobile device destination icon, not launching a mobile device destination.

And in greater particularity, the latter embodiment of the method of operation includes the following steps:

(a) displaying a display screen depicting a group of at least one mobile device destination icon of the library of mobile device destination icons, and a navigation icon for navigating through the library of mobile device destination icons;

(b) on detecting continuous user contact stationary at the navigation icon, proceeding to periodically refresh the display screen with at least one new mobile device destination icon; and (c) in accordance with one of two alternative mobile device destination selection schemes:

(c1) on detecting user release from the touch sensitive screen, thereby terminating a user's single discrete navigation gesture, at a mobile device destination icon of a user selected mobile device destination, launching the mobile device destination, and on detecting user release from the touch sensitive screen not at a mobile device destination icon, not launching a mobile device destination, and (c2) displaying a destination zone for indicating a mobile device destination icon of an instantaneously displayed group of at least one mobile device destination icon and a cancel navigation icon for not launching a mobile device destination on detection of user release from the touch sensitive screen thereat, whereupon, on detecting user release from the touch sensitive screen at any screen location except at the cancel navigation icon, launching the mobile device destination associated with the mobile device destination icon indicated by the destination zone.

This second aspect of the present invention can be optionally implemented in combination with the first aspect of the present invention. Accordingly, a user draws a single discrete navigation gesture to initially select a parent mobile device destination and subsequently proceeds to select a child mobile device destination associated with the user selected parent mobile device destination without user release from the touch sensitive screen. Implementation of both the first and second aspects of the present invention affords a user the ability to use a single discrete navigation gesture to select and launch any mobile device destination from a lock screen.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 5 is a conceptual diagram showing a first application library display screen for depicting a maximum 4×4 matrix of mobile device application icons APP1, APP2, . . . , APP16 and a navigation bar;

FIG. 6 is a conceptual diagram showing a second application library display screen for depicting a maximum 4×4 matrix of mobile device application icons APP17, APP18, . . . , APP32 and a navigation bar;

DETAILED DESCRIPTION OF PREFERRED EMBODIMENTS OF THE INVENTION

Figure 1:
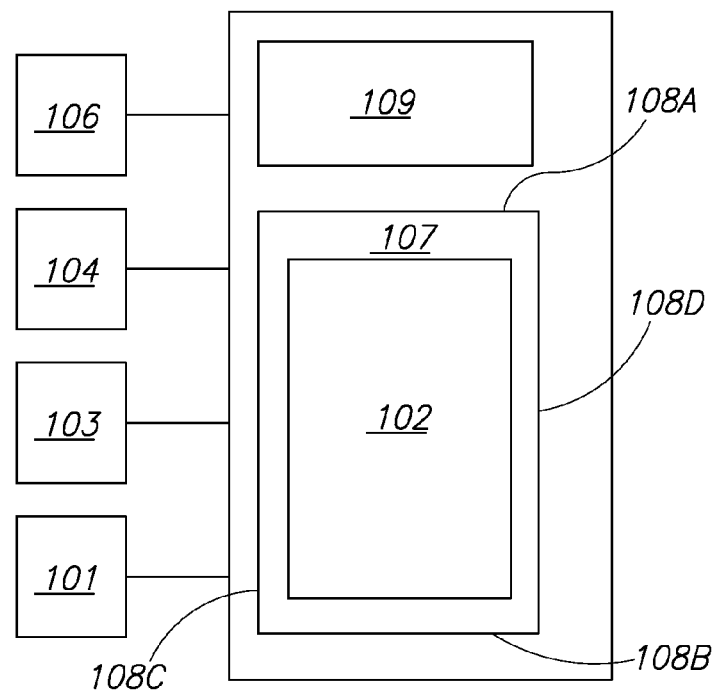
FIG. 1 is a conceptual diagram showing an exemplary touch sensitive mobile device in a portrait orientation.

FIG. 1 shows a touch sensitive mobile device 100 in a portrait orientation. The mobile device 100 includes a power source 101, a generally rectangular touch sensitive screen 102, a microphone 103, a loudspeaker 104, and a built-in camera 106. The mobile device 100 has a casing 107 surrounding the touch sensitive screen 102. The casing 107 has an uppermost edge 108A, a lowermost edge 108B, a left side edge 108C and a right side edge 108D.

The mobile device 100 includes a mobile device operating system 109 operative with the touch sensitive screen 102 for displaying display screens, and detecting user contact thereon and user release therefrom. The mobile device operating system 109 enables user drawing of discrete navigation gestures for enabling a user to launch different mobile device applications, for example, a phone application for placing a call, a messaging application for sending a message, a built-in camera, a game application for playing a game, and the like.

FIGS. 2 to 7 depict conventional mobile device display screens for the purpose of better understanding the present invention. A circle icon is employed for indicating the location of a user's finger on the touch sensitive screen 102.

Figure 2:
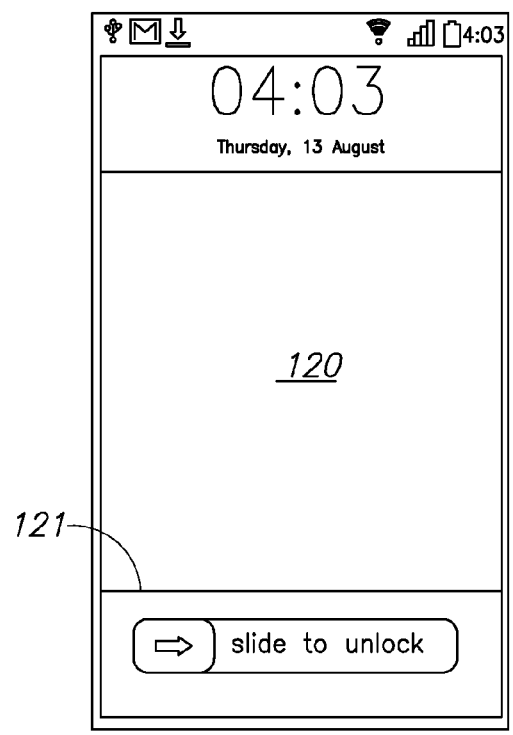
FIG. 2 is a conceptual diagram showing a lock screen.

FIG. 2 shows the mobile device 100 in its locked state depicting a lock screen 120 showing a lock icon 121 indicating a discrete sideways unlock gesture for activating the mobile device 100. Other discrete unlock gestures include inter alia a generally upwards gesture, and the like.

Figure 3:
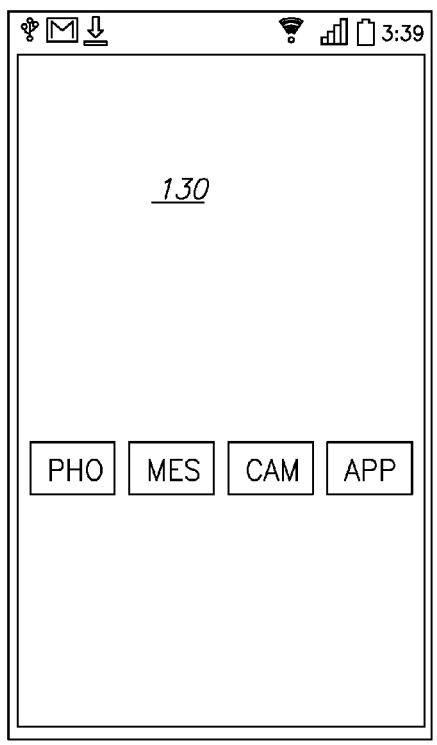
FIG. 3 is a conceptual diagram showing a home screen depicting four parent mobile device destination icons.

FIG. 3 shows the mobile device 100 displaying a home screen 130 depicting a list of four parent mobile device destination icons as follows: a parent mobile device destination icon PHO of a phone application destination, a parent mobile device destination icon MES of a messaging options destination, a parent mobile device destination icon CAM of a built-in camera destination and a parent mobile device destination icon APP of an application library destination.

Figure 4:
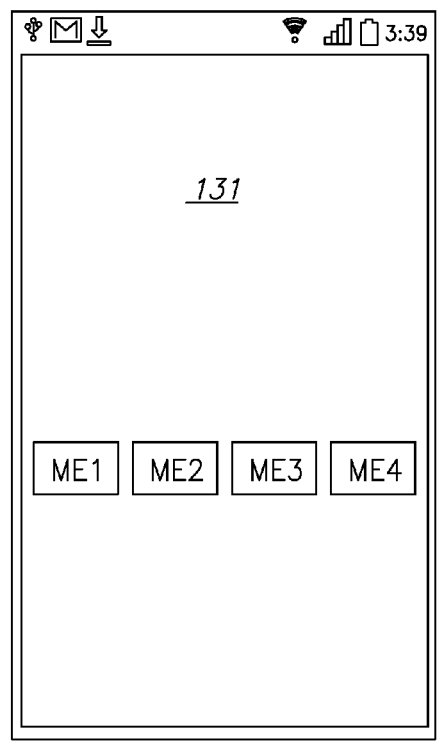
FIG. 4 is a conceptual diagram showing a messaging options display screen for depicting a list of four messaging application icons.

FIG. 4 shows a messaging options display screen 131 depicting a list of four child mobile device destination icons as follows: a first messaging application ME1, a second messaging application ME2, a third messaging application ME3, and a fourth messaging application ME4. The messaging options display screen 131 replaces the home screen 130 and therefore the screen locations of the four messaging application icons can be correspondingly identical to the screen locations of the four parent mobile device destination icons.

Conventional mobile device operation for launching the messaging application ME3 starting from the lock screen 120 requires a user to draw three discrete navigation gestures as follows: A first horizontal sideways swipe to activate the mobile device 100 to arrive at the home screen 130. A first tap on the messaging options icon MES to launch the messaging options display screen 131. And a second tap on the messaging application icon ME3 to launch the messaging application ME3.

Figure 7:
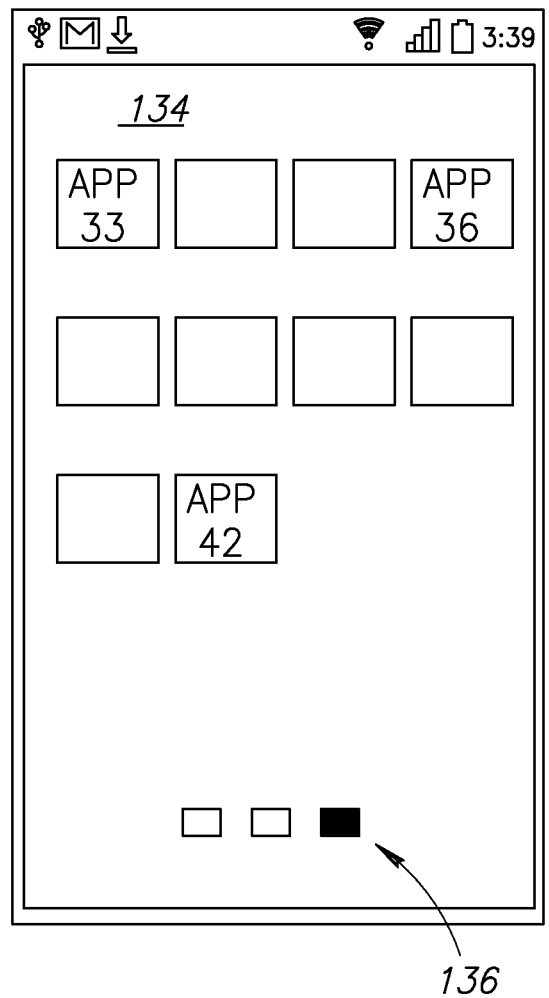
FIG. 7 is a conceptual diagram showing a third application library display screen for depicting a maximum 4×4 matrix of mobile device application icons APP33, APP34, . . . , APP48 and a navigation bar.

FIGS. 5 to 7 show the mobile device 100 displaying three consecutive application library display screens 132, 133 and 134 each intended to depict a 4×4 matrix of child mobile device destination icons in the form of sixteen application icons, respectively. FIG. 5 shows a first application library display screen 132 depicting sixteen application icons labeled APP1, APP2 . . . , and APP16, FIG. 6 shows a second application library display screen 133 depicting sixteen application icons labeled APP17, APP18, . . . , and APP32, and FIG. 7 shows a third application library display screen 134 depicting ten application icons labeled APP33, APP34, . . . , and APP42 from a possible maximum sixteen application icons.

FIGS. 5 to 7 also show a navigation bar 136 for indicating the complete list of three application library display screens 132, 133 and 134. The navigation bar 136 visually distinguishes a presently displayed application library display screen from the other application library display screens. A user can navigate between the three application library display screens by tapping on the navigation bar 136. Alternatively, a user can navigate between the three application library display screens by a forward swipe towards the right side edge 108D or a backward swipe towards the left side edge 108C to respectively display the next or previous application library display screen.

Conventional mobile device operation for launching the application icon APP36 from the lock screen 120 is as follows: A first horizontal sideways swipe to activate the mobile device 100 to arrive at the home screen 130. A first tap on the application library icon APP to launch the FIG. 5 application library display screen 132. A second tap on the navigation bar 136 to directly arrive at the FIG. 7 application library display screen 134 including the intended application icon APP36. A third tap on the application icon APP36 to launch same. Possibly one more additional discrete navigation gesture is required to arrive at the FIG. 7 application library display screen 134 via the FIG. 6 application library display screen 133.

Single Discrete Navigation Gesture to Select and Launch a User Selected Child Mobile Device Destination from a Mobile Device Destination Set For better understanding the first aspect of the present invention, parent mobile device destinations can be classified as having one of three destination functionalities as follows:

A first destination functionality whereupon, on detection of user contact at a parent mobile device destination icon, the mobile device 100 displays an intermediate navigation display screen displaying child mobile device destination icon(s) of at least one child mobile device destination pointed to by the user selected parent mobile device destination. Detection of user release from the touch sensitive screen 102 at one of the child mobile device destination icons launches the child mobile device destination associated therewith. Detection of user release at any other screen location on the touch sensitive screen 102 including at a parent mobile device destination icon does not launch a child mobile device destination. Such user release typically leads to the mobile device 100 displaying either the same display screen displayed immediately prior to user release or a default display screen.

A second destination functionality similar to the first destination functionality and differing therefrom insofar that user release from the touch sensitive screen 102 at a parent mobile device destination icon of a user selected parent mobile device destination launches the parent mobile device destination.

And a third destination functionality whereupon, on detection of user release from the touch sensitive screen 102 at a parent mobile device destination icon of a user selected parent mobile device destination, the mobile device 100 launches the parent mobile device destination. Such parent mobile device destinations do not have one or more child mobile device destinations. Typical third destination functionality types include inter alia launching a mobile device capability only, for example, operating a built-in camera. Detection of user release from the touch sensitive screen 102 at any other screen location on the touch sensitive screen 102 does not launch a parent mobile device destination. Such user release typically leads to the mobile device 100 displaying either the same display screen displayed immediately prior to user release or a default display screen.

In the following description, the messaging options destination MES is deemed to have first destination functionality, the phone application destination PHO is deemed to have second destination functionality, and the built-in camera destination CAM is deemed to have third destination functionality. The application library destination APP is also deemed to have first destination functionality.

Figure 8:
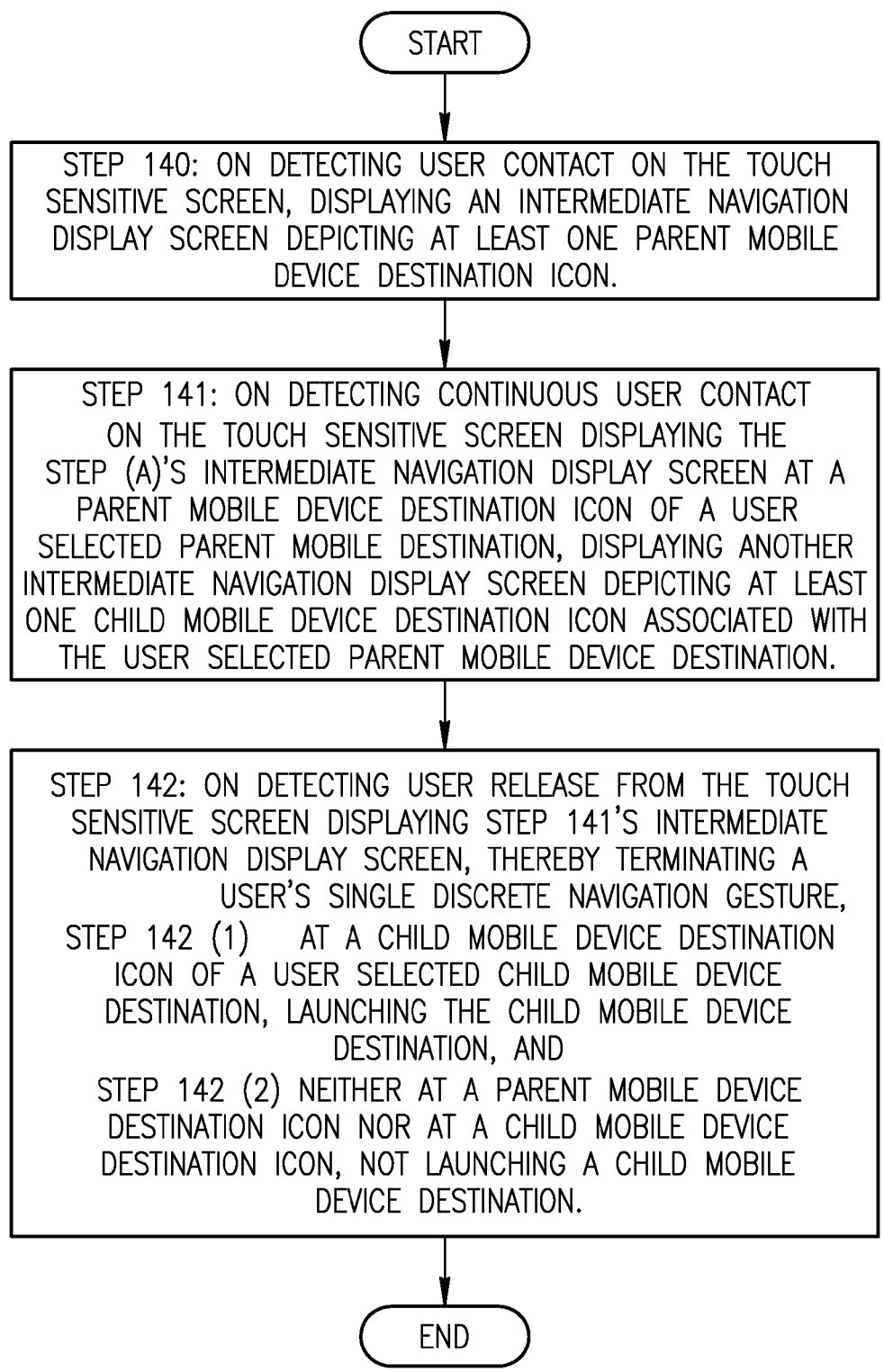
FIG. 8 is a flow diagram of a method of operation of a touch sensitive mobile device for enabling a user to employ a single discrete navigation gesture to navigate a mobile device destination set to select and launch a mobile device destination in accordance with a first aspect of the present invention.

FIG. 8 is a flow diagram of a method of operation of a touch sensitive mobile device for enabling a user to employ a single discrete navigation gesture to navigate a mobile device destination set to select and launch a user selected child mobile device destination. The flow diagram includes the following steps:

Step 140: On detecting user contact on the touch sensitive screen, displaying an intermediate navigation display screen depicting at least one parent mobile device destination icon.

Step 141: On detecting continuous user contact on the touch sensitive screen displaying the step 140's intermediate navigation display screen at a parent mobile device destination icon of a user selected parent mobile device destination, displaying another intermediate navigation display screen depicting at least one child mobile device destination icon associated with the user selected parent mobile device destination.

Step 142: On detecting user release from the touch sensitive screen displaying step 141's intermediate navigation display screen, thereby terminating a user's single discrete navigation gesture, Step 142(1) at a child mobile device destination icon of a user selected child mobile device destination, launching the child mobile device destination, and Step 142(2) neither at a parent mobile device destination icon nor at a child mobile device destination icon, not launching a child mobile device destination.

Figure 9:
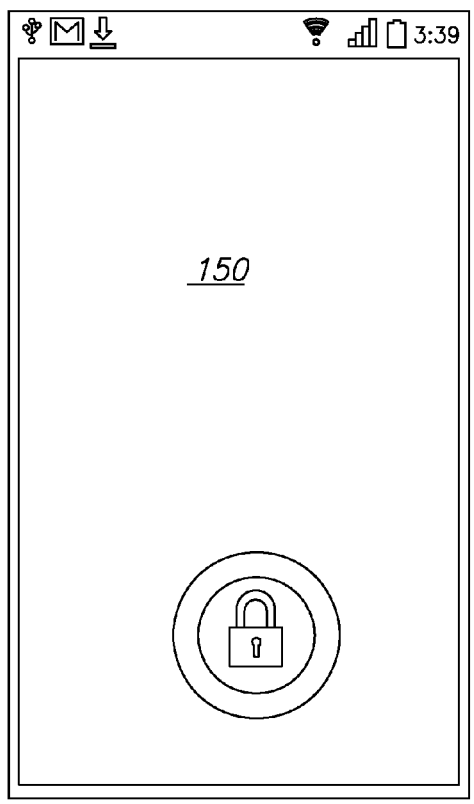
FIG. 9 is a conceptual diagram showing a lock screen depicting a user activating a mobile device operative in accordance with a first aspect of the present invention from its lock screen.

FIGS. 9 to 22 show display screens of a mobile device 100 operative in accordance the first aspect of the present invention as follows:

FIG. 9 shows a lock screen 150 depicting a user activating his mobile device from its lock state to start gesture navigation of the mobile device destination set with a single discrete navigation gesture to select and launch a mobile device destination.

Figure 10:
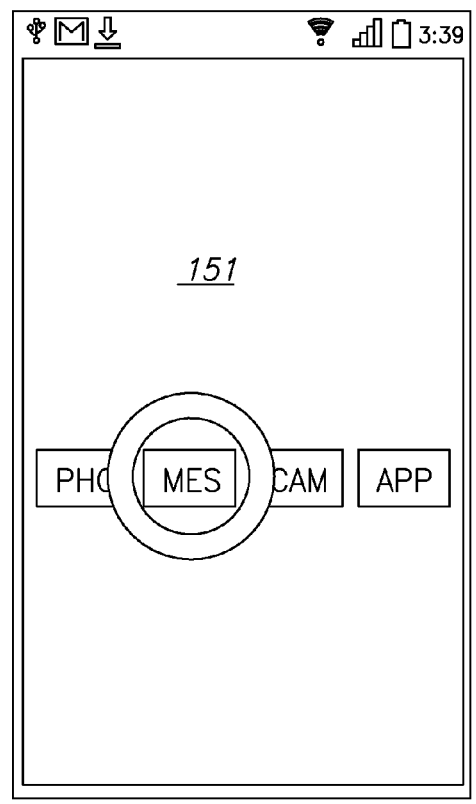
FIG. 10 is a conceptual diagram showing an intermediate navigation display screen depicting four parent mobile device destination icons PHO, MES, CAM and APP and the user continuing his discrete navigation gesture to select the parent mobile device destination icon MES.

FIG. 10 shows an intermediate navigation display screen 151 depicting the four parent mobile device destination icons PHO, MES, CAM and APP and the user continuing his single discrete navigation gesture from the lock screen 150 to select the messaging options destination icon MES. The intermediate navigation display screen 151 displays the same four parent mobile device destination icons PHO, MES, CAM and APP as the home screen 130 but the former 151 differs from the latter 130 insofar as the former 151 is displayed during continuous user contact on the touch sensitive screen 102 as part of a user's single discrete navigation gesture. Detection of user release from the touch sensitive screen 102 not at one of the four parent mobile device destination icons leads to the mobile device 100 not launching a parent mobile device destination and possibly displaying a default display screen. The default display screen is typically either the lock screen 150 or the intermediate navigation display screen 151 such that the user can start navigating through the mobile device destination set again.

Figure 11:
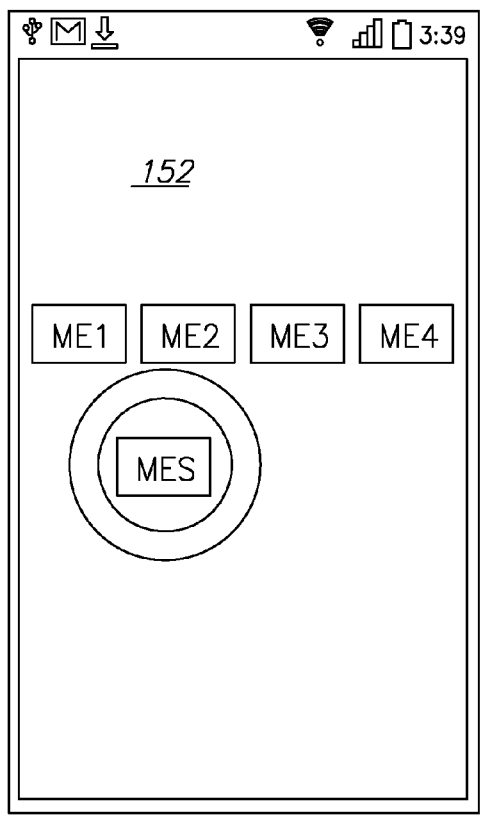
FIG. 11 is a conceptual diagram showing an intermediate navigation display screen simultaneously depicting the user selected parent mobile device destination icon MES and its four child mobile device destination icons ME1, ME2, ME3 and ME4.

FIG. 11 shows an intermediate navigation display screen 152 simultaneously depicting the user selected parent mobile device destination icon MES and its associated list of four child mobile device destination icons ME1, ME2, ME3 and ME4. Depending on the mobile device, user selection of a parent mobile destination icon can be indicated, for example, by a short vibration.

The four child mobile device destination icons ME1, ME2, ME3 and ME4 are depicted offset from the user selected parent mobile device destination icon MES such that the user can continue his single discrete navigation gesture to select one of them. The default display screen 150 or 151 is displayed on detection of user release from the touch sensitive screen 102 not at one of the displayed four child mobile device destination icons. Optionally, the intermediate navigation display screen 152 does not depict the user selected parent mobile device destination icon MES which is in any case at least partially obscured from view by the user's finger.

Figure 12:
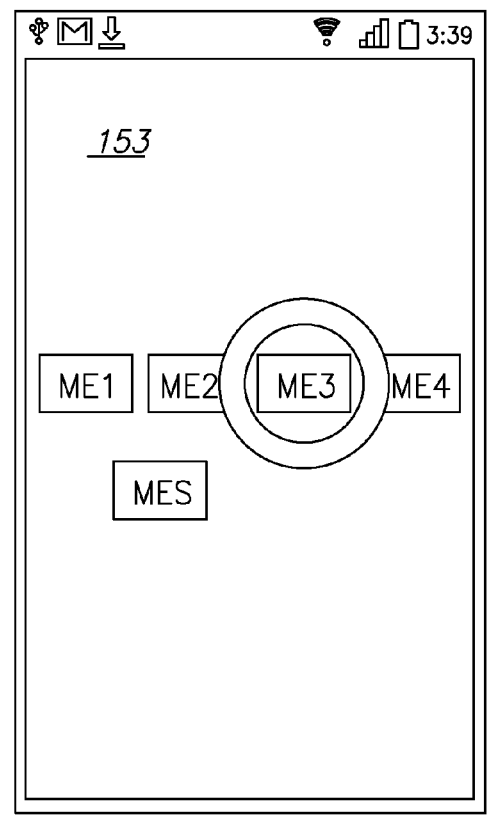
FIG. 12 is a conceptual diagram showing an intermediate navigation display screen depicting the user continuing his discrete navigation gesture on the FIG. 11 intermediate navigation display screen to select the child mobile device destination icon ME3.

FIG. 12 shows an intermediate navigation display screen 153 depicting the user continuing his single discrete navigation gesture on the touch sensitive screen 102 displaying the intermediate navigation display screen 152 to select the child mobile device destination icon ME3.

Figure 13:
FIG. 13 is a conceptual diagram showing a destination display screen on detection of user release from the FIG. 12 intermediate navigation display screen at the child mobile device destination icon ME3 to launch the user selected child mobile device destination ME3.

FIG. 13 shows a destination display screen 154 depicting the launching of the messaging application ME3 on detection of user release from the intermediate navigation display screen 153 at the child mobile device destination icon ME3.

Figure 14:
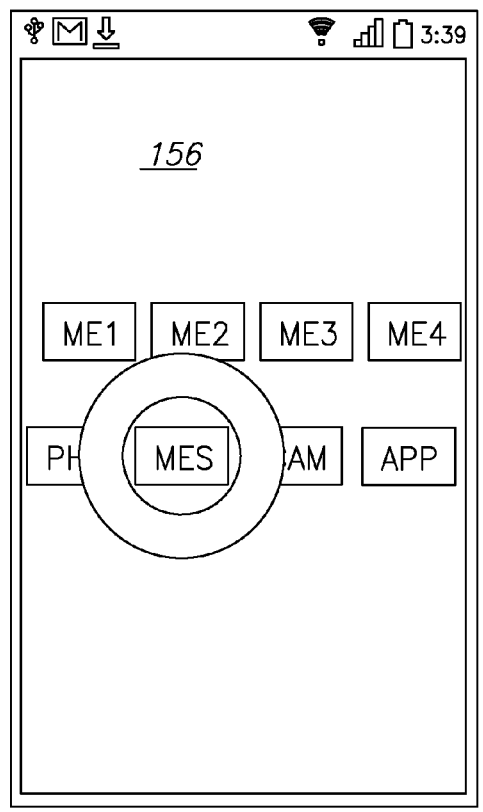
FIG. 14 is a conceptual diagram showing an intermediate navigation display screen simultaneously depicting the four parent mobile device destination icons PHO, MES, CAM and APP, the user selected parent mobile device destination icon MES and its four child mobile device destination icons ME1, ME2, ME3 and ME4.
Figure 15:
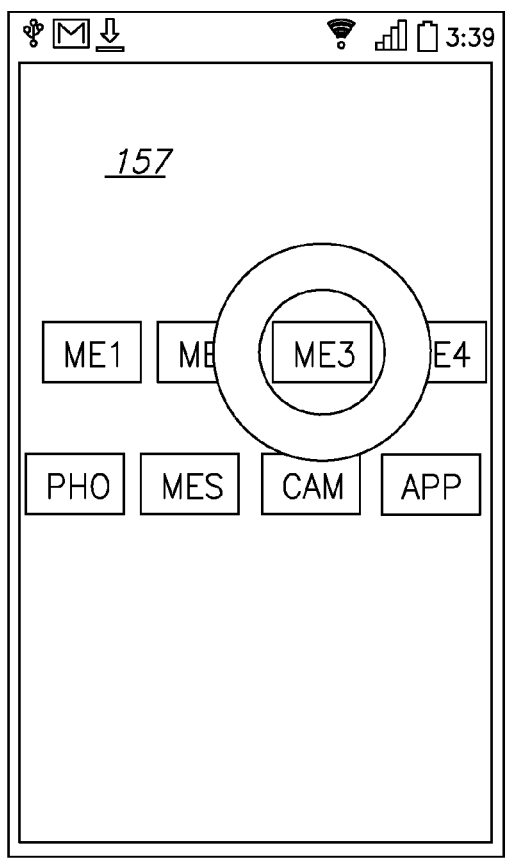
FIG. 15 is a conceptual diagram showing an intermediate navigation display screen depicting the user continuing his discrete navigation gesture on the FIG. 14 intermediate navigation display screen to select the child mobile device destination icon ME3.

FIGS. 14 and 15 show intermediate navigation display screens 156 and 157 similar to the intermediate navigation display screens 152 and 153 but differing therefrom insofar the former 156 and 157 continue to depict the four parent mobile device destination icons PHO, MES, CAM and APP subsequent to user selection of the parent mobile device destination icon MES and the child mobile device destination icon ME3, respectively. The default display screens 150 and 151 may be displayed on detection of user release from the touch sensitive screen 102 displaying the intermediate navigation display screen 156 neither at one of the four parent mobile device destination icons and nor at one of the four child mobile device destination icons. The default display screens 150 and 151 may be displayed on detection of user release from the touch sensitive screen 102 displaying the intermediate navigation display screen 157 neither at one of the four parent mobile device destination icons and nor at one of the child mobile device destination icons.

Figure 16:
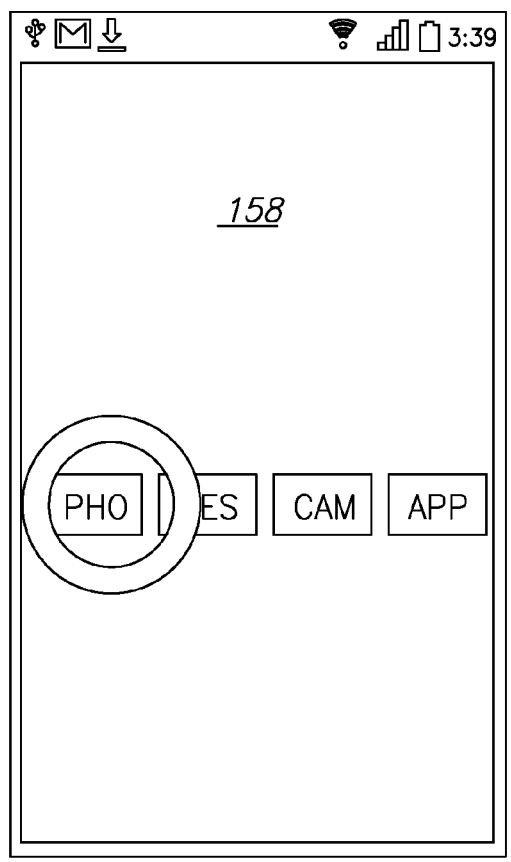
FIG. 16 is a conceptual diagram showing the FIG. 10 intermediate navigation display screen depicting the four parent mobile device destination icons PHO, MES, CAM and APP and the user continuing his discrete navigation gesture to select the parent mobile device destination icon PHO.

FIG. 16 shows an intermediate navigation display screen 158 depicting the four parent mobile device destination icons PHO, MES, CAM and APP and the user continuing his single discrete navigation gesture to select the parent mobile device destination icon PHO.

Figures 17, 18:
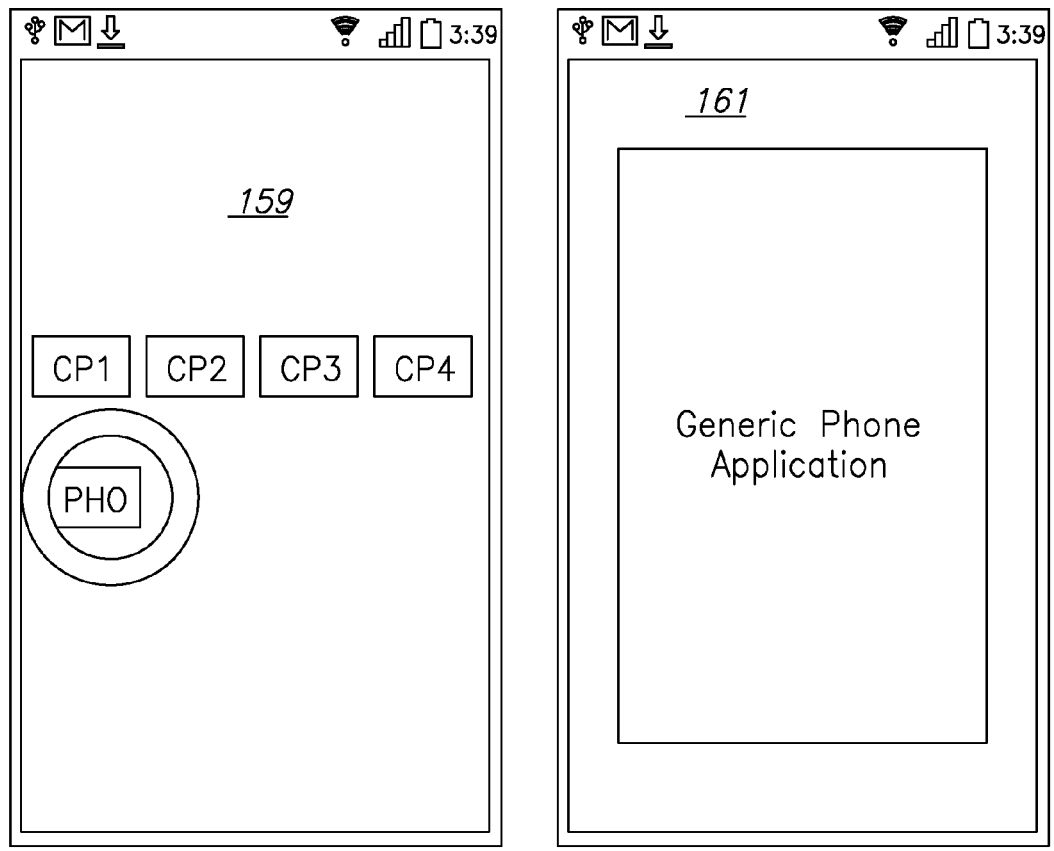
FIG. 17 is a conceptual diagram showing an intermediate navigation display screen simultaneously depicting the user selected parent mobile device destination icon PHO and its four child mobile device destination icons CP1, CP2, CP3 and CP4.
FIG. 18 is a conceptual diagram showing a destination display screen on detection of user release from the FIG. 17 intermediate navigation display screen at the parent mobile device destination icon PHO to launch the phone application.

FIG. 17 shows an intermediate navigation display screen 159 simultaneously depicting the user selected parent mobile device destination icon PHO and its four child mobile device destination icons CP1, CP2, CP3 and CP4 correspondingly representing a first contact person, a second contact person, a third contact person and a fourth contact person.

FIG. 18 shows a destination display screen 161 on detection of user release from the display screen 159 at the parent mobile device destination icon PHO to select and launch the phone application.

Figure 19:
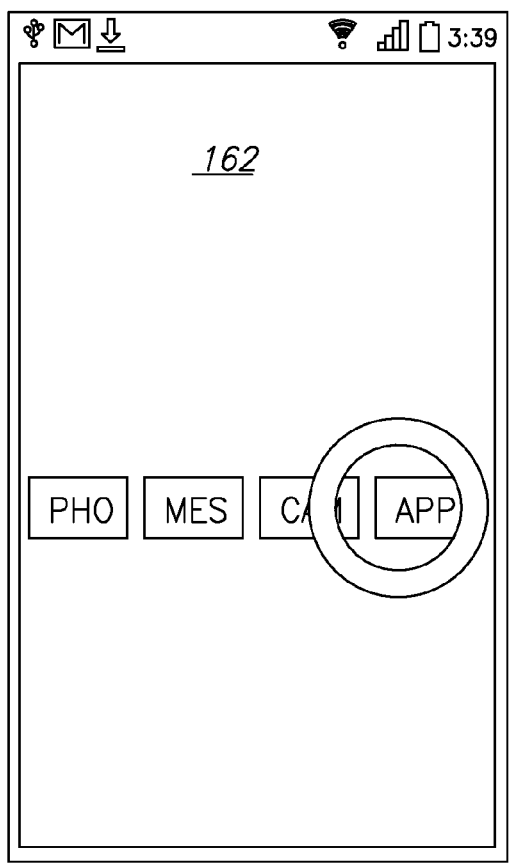
FIG. 19 is a conceptual diagram showing the FIG. 10 intermediate navigation display screen depicting four parent mobile device destination icons PHO, MES, CAM and APP and the user continuing his discrete navigation gesture to select the parent mobile device destination icon APP.

FIG. 19 shows an intermediate navigation display screen 162 depicting the four parent mobile device destination icons PHO, MES, CAM and APP and the user continuing his single discrete navigation gesture to select the parent mobile device destination icon APP.

Figure 20:
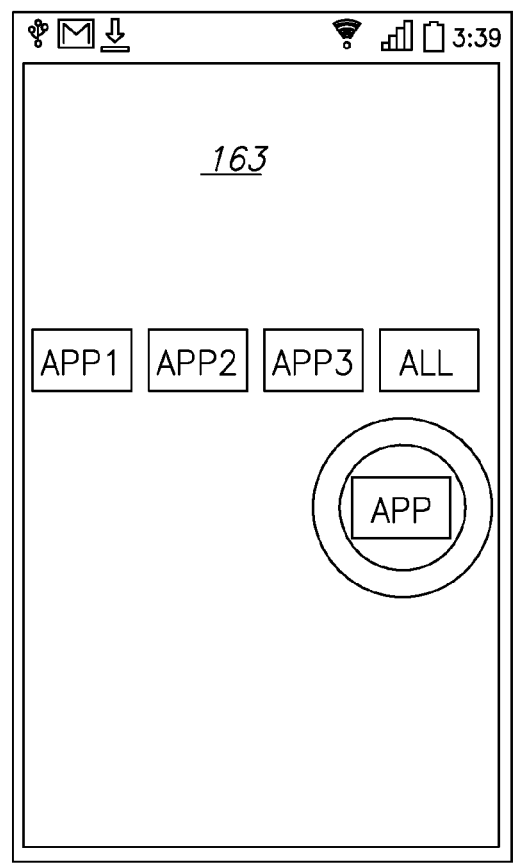
FIG. 20 is a conceptual diagram showing an intermediate navigation display screen simultaneously depicting the user selected parent mobile device destination icon APP and its four child mobile device destination icons APP1, APP2, APP3 and ALL.

FIG. 20 shows an intermediate navigation display screen 163 simultaneously depicting the user selected parent mobile device destination icon APP and its four child mobile device destination icons APP1, APP2, APP3 and ALL.

Figure 21:
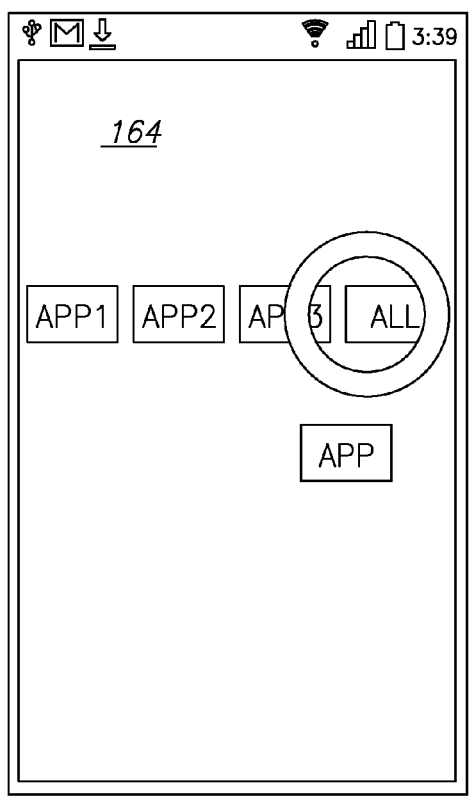
FIG. 21 is a conceptual diagram showing an intermediate navigation display screen depicting the user continuing his discrete navigation gesture on the FIG. 20 intermediate navigation display screen to select the child mobile device destination icon ALL.
Figure 22:
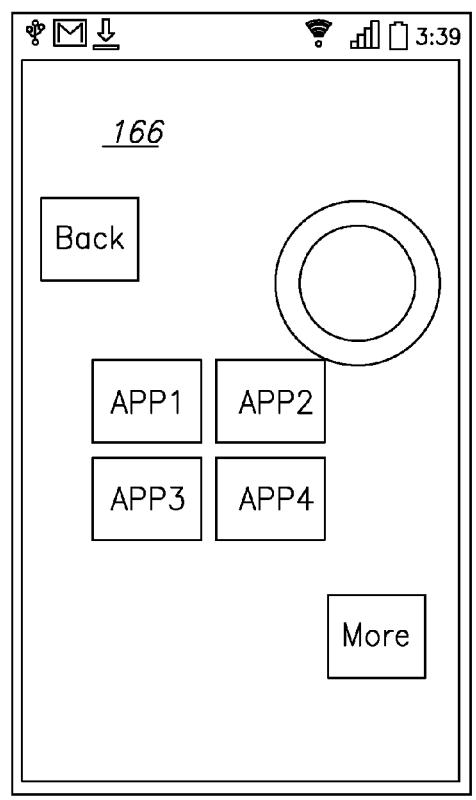
FIG. 22 is a conceptual diagram showing an intermediate navigation display screen depicting operation of the child mobile device destination icon ALL to launch a display screen for enabling the user to scroll through an application library and select an application to launch.

FIG. 21 shows an intermediate navigation display screen 164 depicting the user continuing his single discrete navigation gesture to select the child mobile device destination icon ALL to launch a start navigation display screen 166 shown in FIG. 22 for enabling the user to scroll through an application library and select an application. Operation of the start navigation display screen 166 is described hereinbelow with reference to a second aspect of the present invention.

Single Discrete Navigation Gesture to Select and Launch a User Selected Mobile Device Destination from a Library of Mobile Device Destinations FIGS. 23 to 37 relate to a method of operation of a touch sensitive mobile device according to the second aspect of the present invention for enabling a user to employ a single discrete navigation gesture to navigate a library of mobile device destinations to select and launch a mobile device destination.

The second aspect of the present invention is now explained subsequent to a user tapping an application library icon APP but equally applies to other libraries of mobile device destinations.

The mobile device can be operative with two embodiments of the second aspect of the present invention in which case a user can optionally select his preferred default embodiment. Alternatively, embodiments can be automatically selected as a function of the number of members of a library of mobile device destinations.

FIGS. 23 to 32 relate to one embodiment of the second aspect of the present invention, and FIGS. 33 to 37 relate to an alternative embodiment of the second aspect of the present invention.

Figure 23:
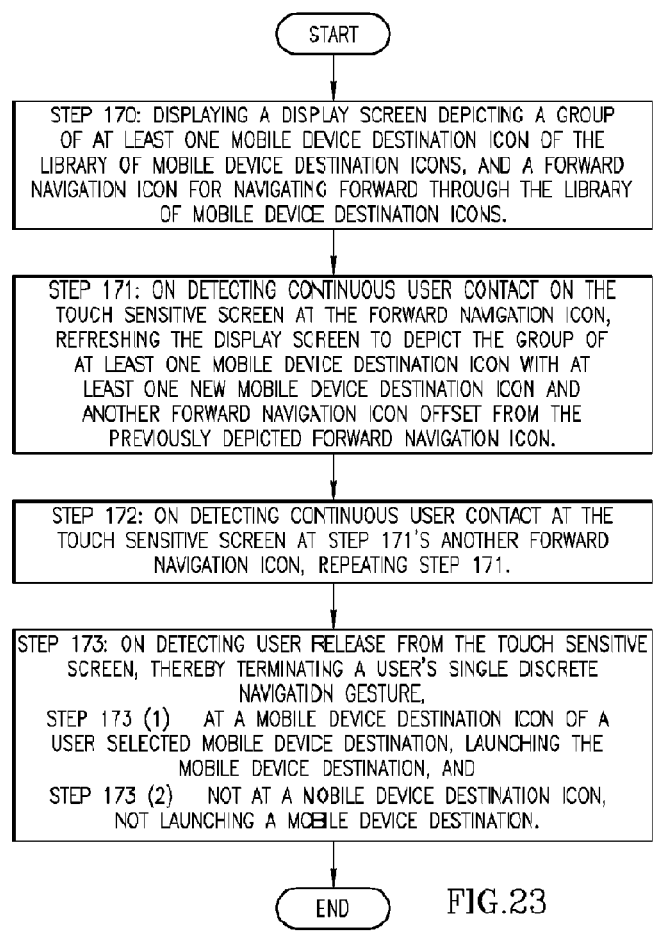
FIG. 23 is a flow diagram of a method of operation of a touch sensitive mobile device for enabling a user to employ a single discrete navigation gesture to navigate a library of mobile device mobile device destinations to select and launch a mobile device destination in accordance with one embodiment of a second aspect of the present invention.

Single Discrete Navigation Gesture to Select and Launch a User Selected Mobile Device Destination from a Static Group of Mobile Device Destinations FIG. 23 is a flow diagram of a method of operation of a touch sensitive mobile device according to one embodiment of the second aspect of the present invention and FIGS. 24 to 32 show display screens of the mobile device 100 operative in accordance therewith.

The flow diagram includes the following steps:

Step 170: Displaying a display screen depicting a group of at least one mobile device destination icon of the library of mobile device destination icons, and a forward navigation icon for navigating forward through the library of mobile device destination icons.

Step 171: On detecting continuous user contact on the touch sensitive screen at the forward navigation icon, refreshing the display screen to depict the group of at least one mobile device destination icon with at least one new mobile device destination icon and another forward navigation icon offset from the previously depicted forward navigation icon.

Step 172: On detecting continuous user contact at the touch sensitive screen at step 171's another forward navigation icon, repeating step 171.

Step 173: On detecting user release from the touch sensitive screen, thereby terminating a user's single discrete navigation gesture:

Step 173(1) at a mobile device destination icon of a user selected mobile device destination, launching the user selected mobile device destination, and Step 173(2) not at a mobile device destination icon, not launching a mobile device destination.

Figure 24:
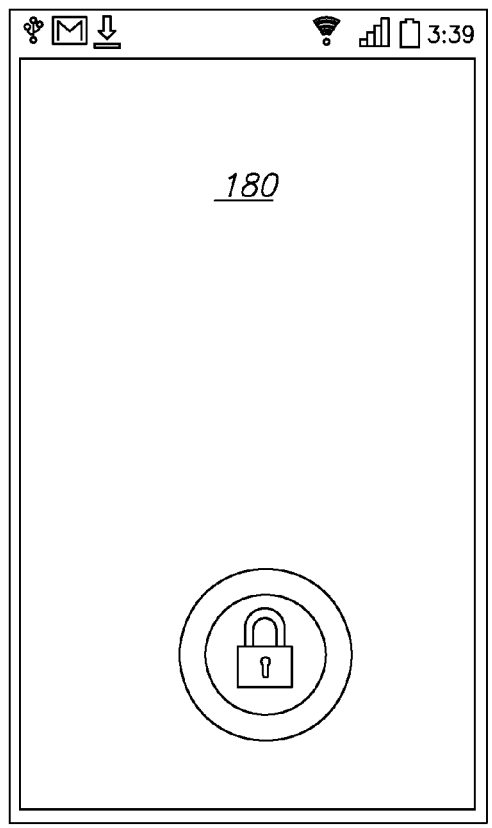
FIG. 24 is a conceptual diagram showing a display screen depicting showing a user activating a mobile device operative in accordance with a second aspect of the present invention from its lock screen.

FIG. 24 shows a lock screen 180 depicting a user activating his mobile device from its lock screen to start navigating through a library of mobile device destinations with a single discrete navigation gesture to select and launch a mobile device destination.

Figure 25:
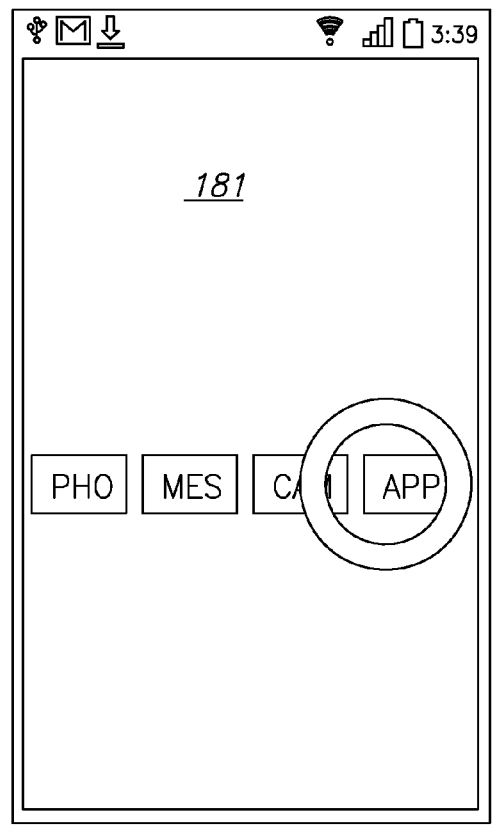
FIG. 25 is a conceptual diagram showing a home screen depicting four parent mobile device destination icons PHO, MES, CAM and APP and the user continuing his single discrete navigation gesture to select the application library icon APP.

FIG. 25 shows an intermediate navigation display screen 181 depicting four parent mobile device destination icons PHO, MES, CAM and APP and the user continuing his single discrete navigation gesture to select the application library icon APP. The intermediate navigation display screen 181 displays the same four parent mobile device destination icons PHO, MES, CAM and APP as the home screen 130 but the former 181 differs from the latter 130 insofar as the former 181 is displayed during continuous user contact on the touch sensitive screen 102 as part of a user's single discrete navigation gesture. Detection of user release from the touch sensitive screen 102 displaying the intermediate navigation display screen 181 not at one of the four parent mobile device destination icons may result in no change in the display screen or alternatively displaying a default display screen. The default display screen is typically either the lock screen 180 or the intermediate navigation display screen 181 such that the user can start navigating through the library of mobile device destinations again.

Figure 26:
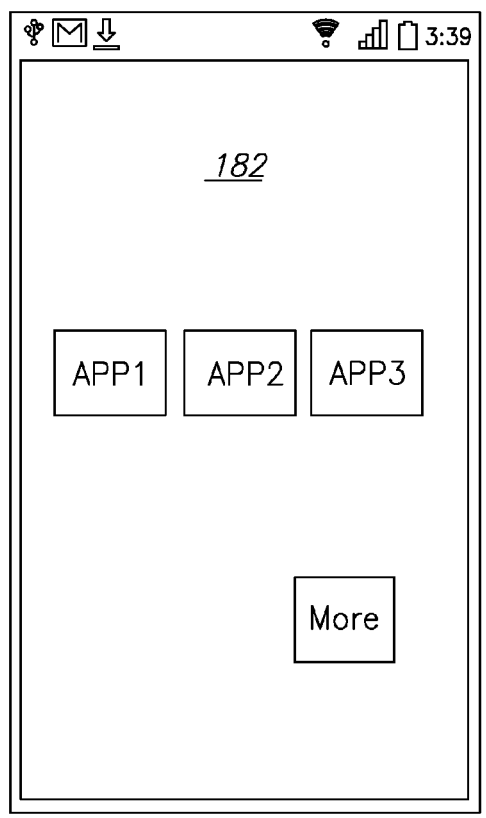
FIG. 26 is a conceptual diagram showing a display screen depicting a static group of three mobile device destination icons and a forward navigation icon MORE.
Figure 27:
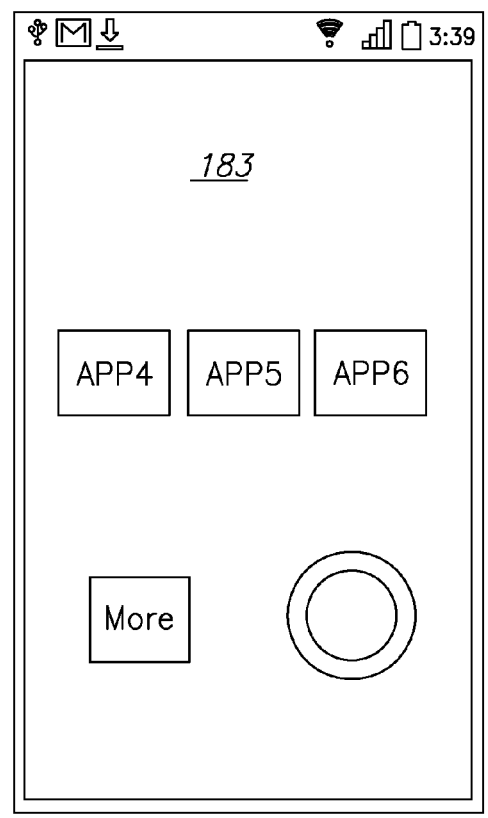
FIG. 27 is a conceptual diagram showing a display screen depicting a modified static group of three mobile device destination icons, a present position of a user's finger and a forward navigation icon MORE.
Figure 28:
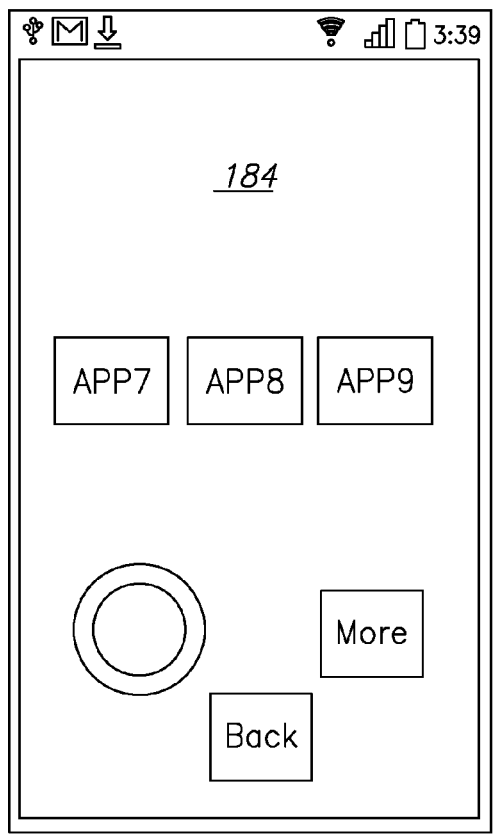
FIG. 28 is a conceptual diagram showing a display screen depicting a modified static group of three mobile device destination icons, a present position of a user's finger, a forward navigation icon MORE and a backward navigation icon BACK.

FIGS. 26 to 28 display three application library display screens 182, 183 and 184 for enabling a user to draw a single discrete navigation gesture to arrive at any application icon from the application library of applications APP1 to APP42 in accordance with one implementation of the second aspect of the present invention.

FIG. 26 shows a first application library display screen 182 depicting a static group of three application icons APP1, APP2 and APP3 and a forward navigation icon MORE for displaying the application library display screen 183. The term "static" means the applications icons APP1, APP2 and APP3 remain depicted until refreshed by a user continuing a single discrete navigation gesture. The application icons are depicted in the upper half of the display screen and the forward navigation icon MORE is depicted such that a user's finger does not obstruct his view of the application icons. Also, the forward navigation icon MORE is conveniently placed for a user to continue his single discrete navigation gesture. A user navigates forward through the application library of applications by sliding his finger left to the forward navigation icon MORE.

FIG. 27 shows the application library display screen 183 depicting a different static group of three application icons APP4, APP5 and APP6, and a forward navigation icon MORE for displaying the application library display screen 184. The forward navigation icon MORE is necessarily depicted offset from the user's present finger position so as to enable the user to continue his single discrete navigation gesture.

FIG. 28 shows the application library display screen 184 depicting a different static group of three application icons APP7, APP8 and APP9, a backward navigation icon BACK for displaying the application library display screen 183 and a forward navigation icon MORE for displaying a fourth application library display screen. The backward and forward navigation icons BACK and MORE are necessarily depicted offset from the user's present finger position so as to enable the user to continue his single discrete navigation gesture.

A user selects an application by sliding his finger to his selected application icon and releasing his finger from the touch sensitive screen 102 thereat. Detection of user release from the touch sensitive screen 102 not at one of the three application icons depicted on an application library display screen, may result in no change in the display screen or alternatively displaying a default display screen.

FIGS. 29 to 32 show an alternative implementation of the second aspect of the present invention. This implementation involves a user drawing a single discrete navigation gesture in the form of the sides of a square in a clockwise circular direction to navigate forward through consecutive different static sets of the application icons and a counterclockwise circular direction to navigate backwards.

Figure 29:
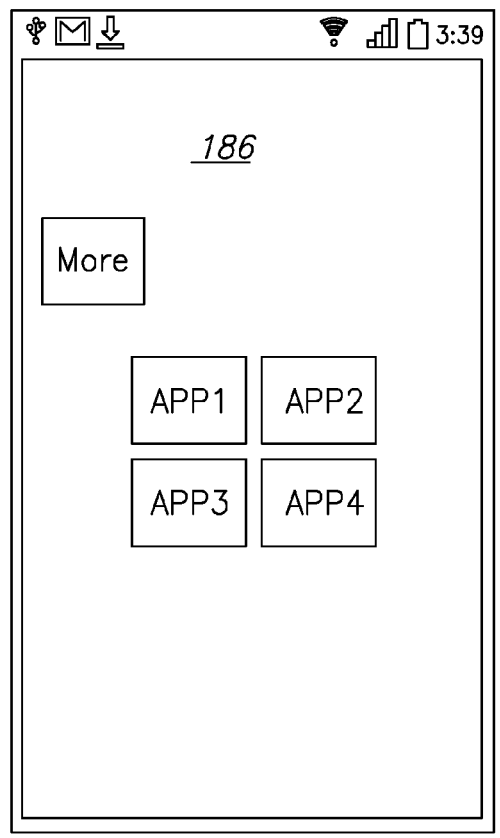
FIG. 29 is a conceptual diagram showing a display screen depicting a static group of four mobile device destination icons and a forward navigation icon MORE.

FIG. 29 shows an application library display screen 186 depicting a static group of four application icons APP1, APP2, APP3 and APP4 and a navigation icon MORE for displaying an application library display screen 187.

Figure 30:
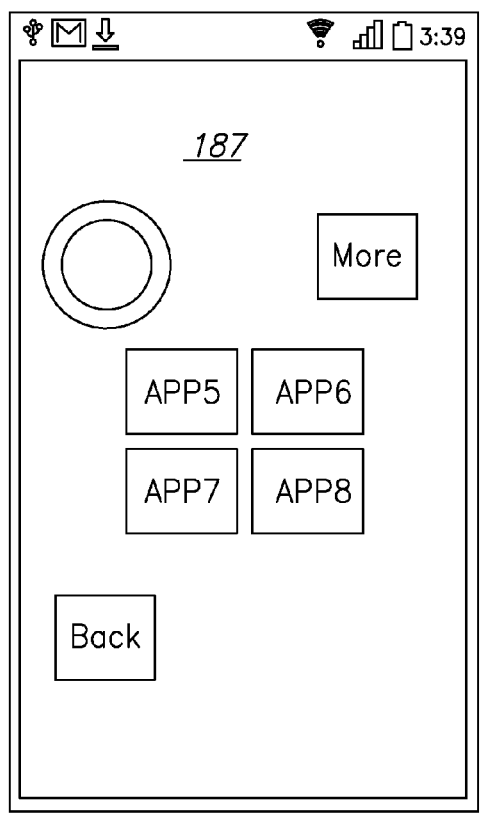
FIG. 30 is a conceptual diagram showing a display screen depicting a modified static group of four mobile device destination icons, a present position of a user's finger, a forward navigation icon MORE and a backward navigation icon BACK.

FIG. 30 shows the application library display screen 187 depicting a static group of four application icons APP5, APP6, APP7 and APP8, a navigation icon MORE for displaying an application library display screen 188 and a navigation icon BACK for displaying the application library display screen 186.

Figure 31:
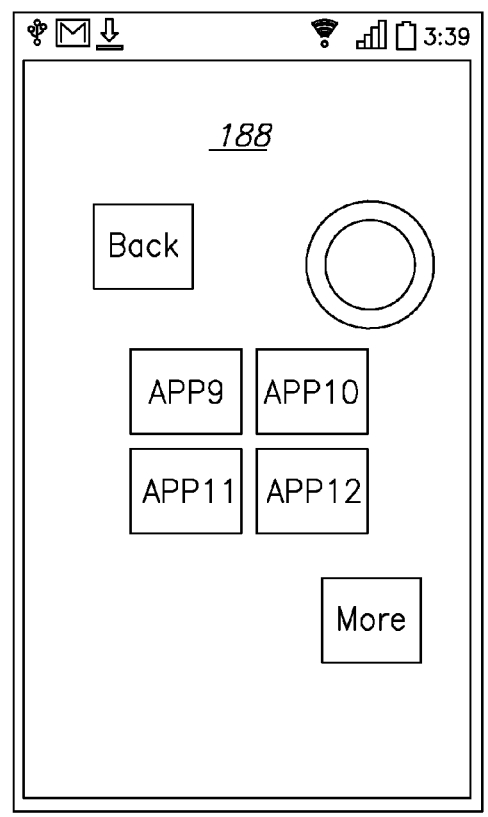
FIG. 31 is a conceptual diagram showing a display screen depicting a modified static group of four mobile device destination icons, a present position of a user's finger, a forward navigation icon MORE and a backward navigation icon BACK.

FIG. 31 shows the application library display screen 188 depicting a static group of four application icons APP9, APP10, APP11 and APP12, a forward navigation icon MORE for displaying an application library display screen 189 and a backward navigation icon BACK for displaying the application library display screen 187.

Figure 32:
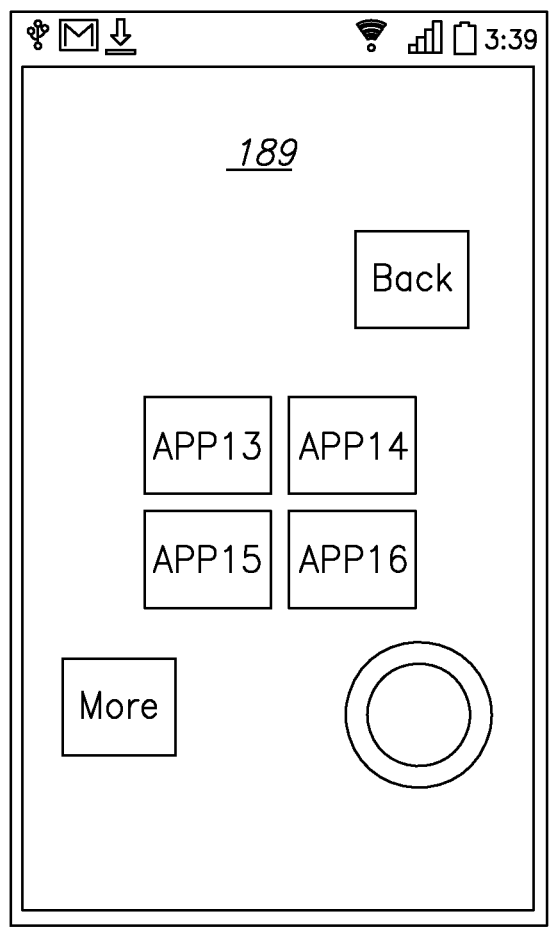
FIG. 32 is a conceptual diagram showing a display screen depicting a modified static group of four mobile device destination icons, a present position of a user's finger, a forward navigation icon MORE and a backward navigation icon BACK.

FIG. 32 shows the application library display screen 189 depicting a static group of four application icons APP13, APP14, APP15 and APP16, a forward navigation icon MORE for displaying a next application library display screen and a backward navigation icon BACK for displaying the application library display screen 188.

The backward and forward navigation icons BACK and MORE are necessarily depicted offset from a user's present finger position so as to enable the user to continue his single discrete navigation gesture.

A user selects an application by sliding his finger to his selected application icon and releasing his finger from the touch sensitive screen thereat. Detection of user release from the touch sensitive screen 102 not at one of the four application icons depicted on an application library display screen, may result in no change in the display screen or alternatively displaying a default display screen.

Figure 33:
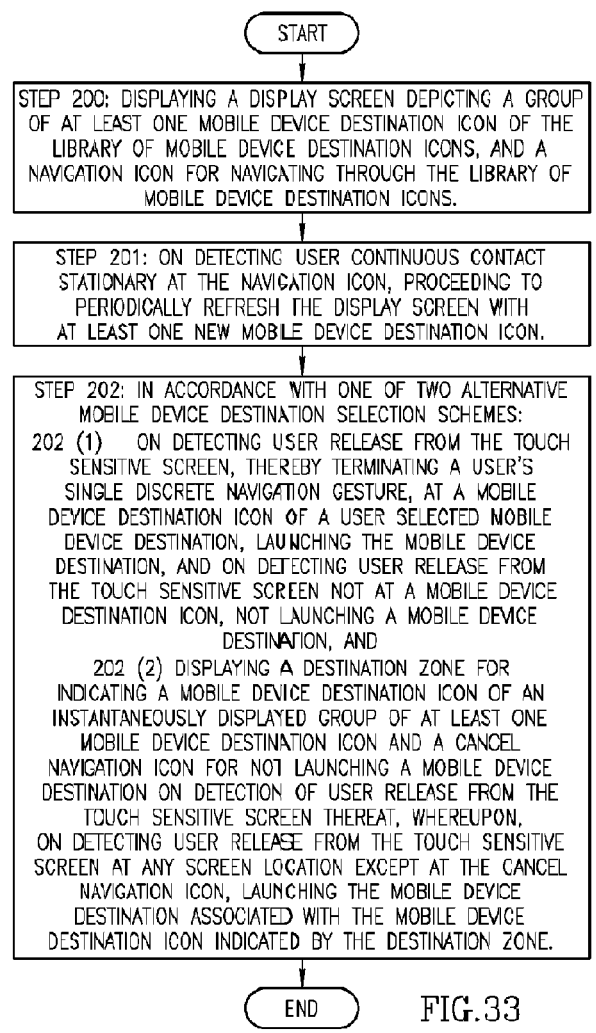
FIG. 33 is a flow diagram of a method of operation of a touch sensitive mobile device for enabling a user to employ a single discrete navigation gesture to navigate a library of mobile device mobile device destinations to select and launch a mobile device destination in accordance with an alternative embodiment of a second aspect of the present invention.

Single Discrete Navigation Gesture to Select and Launch a User Selected Mobile Device Destination from a Dynamic Group of Mobile Device Destinations FIG. 33 is a flow diagram of a method of operation of a touch sensitive mobile device according to an alternative embodiment of the second aspect of the present invention and FIGS. 34 to 37 show display screens of the mobile device 100 operative in accordance therewith.

The flow diagram includes the following steps:

Step 200: Displaying a display screen depicting a group of at least one mobile device destination icon of the library of mobile device destination icons, and a navigation icon for navigating through the library of mobile device destination icons.

Step 201: On detecting continuous user contact stationary at the navigation icon, proceeding to periodically refresh the display screen with at least one new mobile device destination icon.

Step 202: In accordance with one of two alternative mobile device destination selection schemes:

Step 202(1) on detecting user release from the touch sensitive screen, thereby terminating a user's single discrete navigation gesture, at a mobile device destination icon of a user selected mobile device destination, launching the mobile device destination, and on detecting user release from the touch sensitive screen not at a mobile device destination icon, not launching a mobile device destination, and Step 202(2) displaying a destination zone for indicating a mobile device destination icon of an instantaneously displayed group of at least one mobile device destination icon and a cancel navigation icon for not launching a mobile device destination on detection of user release from the touch sensitive screen thereat, whereupon, on detecting user release from the touch sensitive screen at any screen location except at the cancel navigation icon, launching the mobile device destination associated with the mobile device destination icon indicated by the destination zone.

Figure 34:
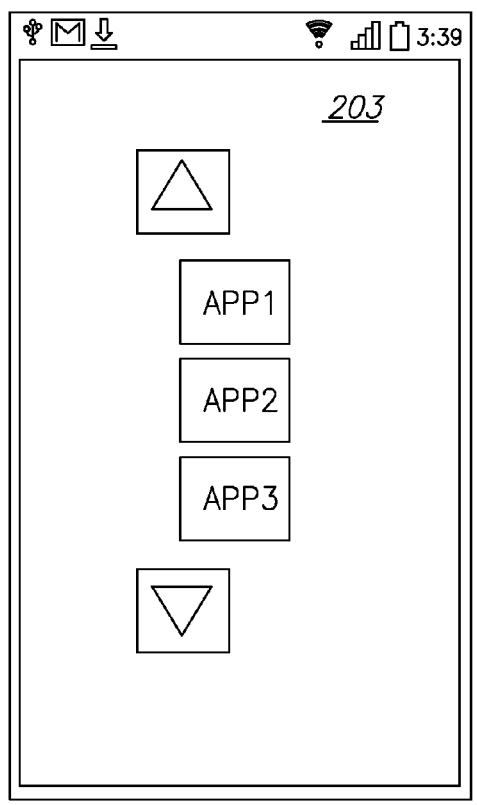
FIG. 34 is a conceptual diagram showing a display screen depicting a dynamic group of three mobile device destination icons, a forward navigation icon MORE and a backward navigation icon BACK.

FIG. 34 shows an application library display screen 203 depicting a dynamic group of three application icons APP1, APP2 and APP3 and two navigation icons including an up arrow navigation icon and a down arrow navigation icon for navigating through the application library for as long as the user maintains his finger thereon as follows: the up arrow navigation icon for navigating forward and the down arrow navigation icon for navigating backward. The term "dynamic" means one or more application icons of an instantaneously depicted group of at least one application icon are automatically periodically refreshed for as long as user maintains his user contact on one of the navigation icons. The user continues his single discrete navigation gesture from one of the arrow navigation icons to select one of displayed application icons and releases his user contact from the touch sensitive screen 102 thereat to launch the user selected application from the released application icon. Detection of user release from the touch sensitive screen 102 not at an application icon, thereby terminating the single discrete navigation gesture, displays either the same display screen or a default display screen. The default display screen can be either one of the lock screen 180 or the intermediate navigation display screen 181.

Figure 35:
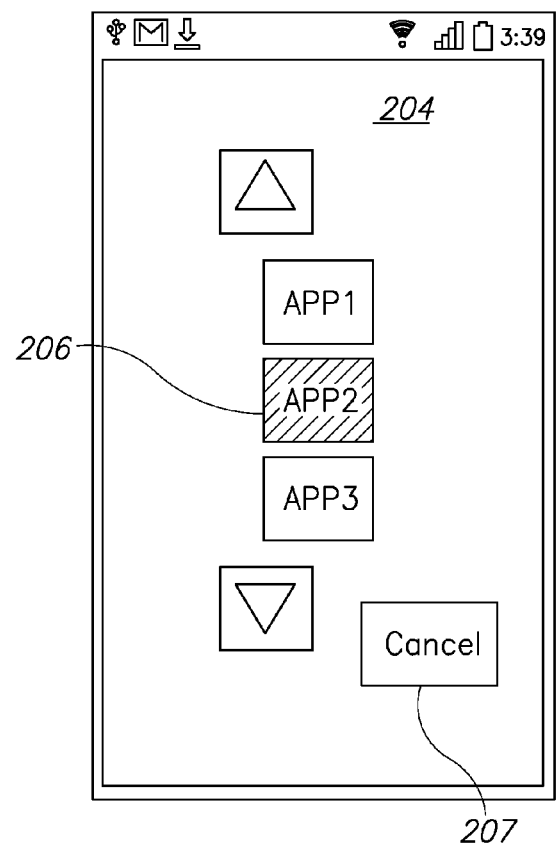
FIG. 35 is a conceptual diagram showing a display screen similar to FIG. 34 and additionally depicting a destination zone for indicating user selection of a mobile device destination on user release from the touch sensitive screen and a cancel navigation icon CANCEL.

FIG. 35 shows an application library display screen 204 similar to the application library display screen 203 but additionally depicting a destination zone 206 for indicating user selection of a mobile device destination on user release from the touch sensitive screen 102 at any screen location except at a cancel navigation icon CANCEL 207 for terminating navigation through the library of mobile device destinations for displaying a default display screen. In this particular instance, the destination zone 206 indicates the application icon APP2 such that user release from the touch sensitive screen 102 at any screen location except the cancel navigation icon CANCEL 207 launches the application APP2. User contact on one of the arrow navigation icons changes the dynamic group of application icons being depicted, thereby enabling a user to launch a different application. The destination zone 206 can employ different visual distinguishing techniques including inter alia color, back flashing, and the like.

Figure 36:
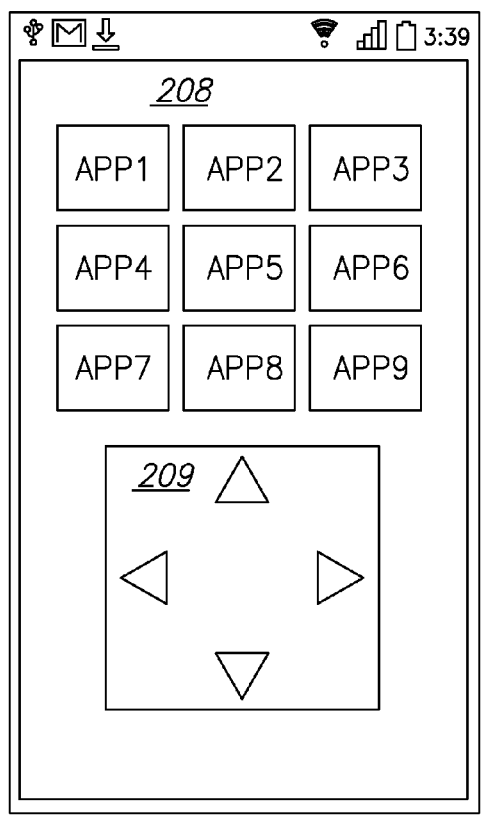
FIG. 36 is a conceptual diagram showing a display screen depicting a 3×3 matrix of mobile device destination icons and a navigation pad icon.

FIG. 36 shows an application library display screen 208 depicting a 3×3 matrix of nine application icons APP1, APP2, . . . , APP9, and a navigation touch pad 209 with four icons for dynamically navigating through the application library for as long as the user maintains his finger thereon as follows: an UP navigation icon for navigating upward, a DOWN navigation icon for navigating downward, a FORWARD navigation icon for navigating forward and a BACKWARD navigation icon for navigating backward. The user continues his single discrete navigation gesture from the navigation touch pad 209 to select one of displayed application icons and releases his user contact from the touch sensitive screen 102 thereat to launch the user selected application from the released application icon. Detection of user release from the touch sensitive screen 102 not at one of the application icons, thereby terminating his single discrete navigation gesture, displays the same display screen or a default display screen.

Figure 37:
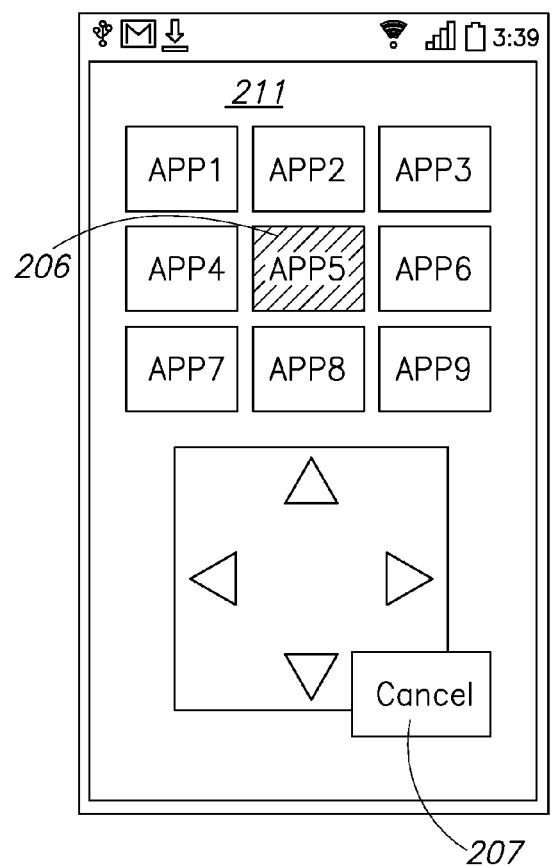
FIG. 37 is a conceptual diagram showing a display screen similar to FIG. 36 and additionally depicting a destination zone for indicating user selection of a mobile device destination on user release from the touch sensitive screen and a cancel navigation icon CANCEL.

FIG. 37 shows an application library display screen 211 similar to the application library display screen 208 but additionally depicting the destination zone 206 and the cancel navigation icon CANCEL 207. In this particular instance, the destination zone 206 indicates the application icon APP5 such that user release from the touch sensitive screen 102 at any screen location except the cancel navigation icon CANCEL 207 launches the application APP5. User contact on the navigation pad icon 209 changes the group of application icons being depicted, thereby enabling a user to launch a different application.

While the invention has been described with respect to a limited number of embodiments, it will be appreciated that many variations, modifications, and other applications of the invention can be made within the scope of the appended claims.

The invention claimed is:

1. A method of operation for a touch sensitive mobile device for enabling a user to employ a single discrete navigation gesture to select and launch a mobile device destination of a library of mobile device destinations, the method of operation comprising:
(a) displaying a display screen on a touch sensitive screen of a mobile device, said display screen depicting a group of at least one mobile device destination icon of a library of mobile device destination icons, and a forward navigation icon for navigating forward through the library of mobile device destination icons, wherein said mobile device destination icons correspond to respective mobile device destinations;
(b) on detecting continuous user contact on the touch sensitive screen at the forward navigation icon, refreshing the display screen to depict the group of at least one mobile device destination icon with at least one new mobile device destination icon and another forward navigation icon offset from the previously depicted forward navigation icon;

(c) on detecting continuous user contact at the touch sensitive screen at step (b)'s another forward navigation icon, repeating step (b); and
(d) on detecting user release from the touch sensitive screen at a selected mobile device destination icon, launching a mobile device destination corresponding to the selected mobile device destination icon.

2. The method according to claim 1, further comprising depicting on the display screen a backward navigation icon offset with respect to the another forward navigation icon for navigating in a backward direction with respect to the forward navigation icon.

3. The method according to claim 2 further comprising on detecting user motion on the touch sensitive screen in alternate opposite directions, displaying consecutive groups of at least one mobile device destination icon.

4. The method according to claim 2 further comprising on detecting user motion on the touch sensitive screen in a circular direction, displaying consecutive groups of at least one mobile device destination icon.

5. The method according to claim 1 further comprising on detecting user motion on the touch sensitive screen in alternate opposite directions, displaying consecutive groups of at least one mobile device destination icon.

6. The method according to claim 1 further comprising on detecting user motion on the touch sensitive screen in a circular direction, displaying consecutive groups of at least one mobile device destination icon.

7. A touch sensitive mobile device for carrying out a method as claimed in claim 1.

8. A method of operation for a touch sensitive mobile device for enabling a user to employ a single discrete navigation gesture to select and launch a mobile device destination of a library of mobile device destinations,
the method of operation comprising:
(a) displaying a display screen on a touch sensitive screen of a mobile device, said display screen depicting a group of at least one mobile device destination icon of a library of mobile device destination icons, and a navigation icon for navigating through the library of mobile device destination icons in at least a first direction and a second direction that is opposite the first direction, wherein said mobile device destination icons correspond to respective mobile device destinations;
(b) on detecting continuous user contact stationary at the navigation icon, periodically refreshing the display screen with at least one new mobile device destination icon;
(c) on detecting user release from the touch sensitive screen, at a selected mobile device destination icon spaced apart from the navigation icon on a sliding displacement of the continuous user contact during the single discrete navigation gesture, launching a mobile device destination corresponding to a selected mobile device destination icon; and
(d) on detecting user release from the touch sensitive screen not at a mobile device destination icon, not launching a mobile device destination.

9. The method according to claim 7 wherein the navigation icon is constituted by a first navigation icon for navigating through the library of mobile device destinations in a first direction and a second navigation icon for navigating through the library of mobile device destinations in an opposite direction to the first navigation icon.

10. The method according to claim 7 wherein the navigation icon is constituted by a navigation pad icon for navigating upwards, downwards, leftwards and rightwards with respect to step (a)'s group of at least one mobile device destination icon.

11. A touch sensitive mobile device for carrying out a method as claimed in claim 8.

12. A method of operation for a touch sensitive mobile device for enabling a user to employ a single discrete navigation gesture to select and launch a mobile device destination of a library of mobile device destinations,
the method of operation comprising:
(a) displaying a display screen on a touch sensitive screen of a mobile device, said display screen depicting a group of at least one mobile device destination icon of a library of mobile device destination icons, and a navigation icon for navigating through the library of mobile device destination icons, wherein said mobile device destination icons correspond to respective mobile device destinations;
(b) on detecting continuous user contact stationary at the navigation icon, periodically refreshing the display screen with at least one new mobile device destination icon;
(c) depicting a destination zone for indicating a mobile destination icon of an instantaneously displayed group of at least mobile destination icon and a cancel navigation icon for not launching a mobile device destination on detection of user release from the touch sensitive screen; and
(d) on detecting user release from the touch sensitive screen at any location except the cancel navigation icon, launching the mobile device destination corresponding to the mobile device destination icon indicated by the destination zone.

13. The method according to claim 10 wherein the navigation icon is constituted by a first navigation icon for navigating through the library of mobile device destinations in a first direction and a second navigation icon for navigating through the library of mobile device destinations in an opposite direction to the first navigation icon.

14. The method according to claim 10 wherein the navigation icon is constituted by a navigation pad icon for navigating upwards, downwards, leftwards and rightwards with respect to step (a)'s group of at least one mobile device destination icon.

15. A touch sensitive mobile device for carrying out a method as claimed in claim 12.

\* \* \* \* \*